United States Patent
Song et al.

(10) Patent No.: US 9,356,296 B2
(45) Date of Patent: May 31, 2016

(54) MEMBRANE-ELECTRODE ASSEMBLY FOR FUEL CELL AND FUEL CELL STACK WITH THE SAME

(75) Inventors: Kah-Young Song, Suwon-si (KR); Hee-Tak Kim, Suwon-si (KR); Sung-Yong Cho, Suwon-si (KR); Sang-Il Han, Suwon-si (KR); Myoung-Ki Min, Suwon-si (KR); Geun-Seok Chai, Suwon-si (KR); Tae-Yoon Kim, Suwon-si (KR)

(73) Assignee: SAMSUNG SDI CO., LTD., Suwon-si, Gyeonggi-do (KR)

( * ) Notice: Subject to any disclaimer, the term of this patent is extended or adjusted under 35 U.S.C. 154(b) by 1010 days.

(21) Appl. No.: 12/715,540

(22) Filed: Mar. 2, 2010

(65) Prior Publication Data

US 2010/0227244 A1    Sep. 9, 2010

(30) Foreign Application Priority Data

Mar. 4, 2009   (KR) ................ 10-2009-0018603

(51) Int. Cl.
*H01M 4/86*      (2006.01)
*H01M 8/02*      (2016.01)
(Continued)

(52) U.S. Cl.
CPC .......... *H01M 4/8642* (2013.01); *H01M 4/8605* (2013.01); *H01M 4/8652* (2013.01); *H01M 4/8663* (2013.01); *H01M 8/0245* (2013.01); *H01M 8/04156* (2013.01); *H01M 8/04171* (2013.01); *H01M 8/1004* (2013.01);
(Continued)

(58) Field of Classification Search
CPC ............... H01M 2008/1095; H01M 4/8605; H01M 4/8642; H01M 4/8652; H01M 8/04156; H01M 8/04171

USPC .................................. 156/400–535
See application file for complete search history.

(56) References Cited

U.S. PATENT DOCUMENTS 3,956,014 A * 5/1976 Landsman et al. ............ 429/524
6,103,393 A    8/2000 Kodas et al.
(Continued)

FOREIGN PATENT DOCUMENTS

CN    1806356 A    7/2006
CN    101019253 A   8/2007
(Continued)

OTHER PUBLICATIONS

Chinese First Office Action in CN 201010129823.6, dated Jun. 27, 2012 (Song, et al.).

(Continued)

*Primary Examiner* — Christopher Schatz
(74) *Attorney, Agent, or Firm* — Lee & Morse, P.C.

(57) ABSTRACT

A membrane-electrode assembly (MEA) for a fuel cell includes a fuel cell electrolyte membrane, an anode disposed at a first side of the electrolyte membrane, and a cathode disposed at a second side of the electrolyte membrane, wherein the cathode has a thickness and an area, the cathode area extending in a plane substantially parallel to a major surface of the electrolyte membrane, the cathode area includes a central area and a peripheral area, the peripheral area extending to lateral edges of the cathode, the central area includes hydrophilic portions and hydrophobic portions, the peripheral area includes hydrophilic portions and hydrophobic portions, and the central area is more hydrophobic than the peripheral area.

17 Claims, 14 Drawing Sheets

(51) Int. Cl.
*H01M 8/04* (2016.01)
*H01M 8/10* (2016.01)

(52) U.S. Cl.
CPC ........... *H01M2004/8689* (2013.01); *H01M 2008/1095* (2013.01); *Y02E 60/521* (2013.01); *Y02P 70/56* (2015.11); *Y10T 29/49108* (2015.01)

(56) References Cited

U.S. PATENT DOCUMENTS

| | | | |
|---|---|---|---|
| 7,642,000 | B2 | 1/2010 | Ku et al. |
| 7,998,638 | B2 | 8/2011 | Kim et al. |
| 2003/0044672 | A1 | 3/2003 | Fukumoto et al. |
| 2004/0038808 | A1 | 2/2004 | Hampden-Smith et al. |
| 2004/0170886 | A1 | 9/2004 | Sukamoto |
| 2007/0284253 | A1* | 12/2007 | Fabian et al. ............ 204/518 |
| 2008/0166542 | A1 | 7/2008 | Sung et al. |
| 2009/0169947 | A1 | 7/2009 | Laurent et al. |
| 2010/0062305 | A1 | 3/2010 | Kadotani et al. |
| 2010/0086830 | A1 | 4/2010 | Shimoi et al. |

FOREIGN PATENT DOCUMENTS

| | | |
|---|---|---|
| EP | 0 872 907 A1 | 10/1998 |
| EP | 1 655 795 A1 | 5/2006 |
| FR | 2 898 731 A1 | 9/2007 |
| JP | 2004-200153 A | 7/2004 |
| JP | 2005-038780 A | 2/2005 |
| JP | 2006-179317 A | 7/2006 |
| JP | 2007-149454 A | 6/2007 |
| JP | 2007-242417 A | 9/2007 |
| JP | 2008-243548 A | 10/2008 |
| KR | 10-2006-0086532 A | 8/2006 |
| KR | 10-0861786 B1 | 10/2008 |
| WO | WO 2004/095603 A2 | 11/2004 |
| WO | WO 2005/048382 A2 | 5/2005 |

OTHER PUBLICATIONS

Korean Office Action in KR 10-2009-0018603, dated Feb. 17, 2011 (Song et al.).

Kühn, M. et al., "A dynamic two-phase flow model of proton exchange membrane fuel cells," Center for Scientific Computation and Mathematical Modeling, University of Maryland, College Park—CSCAMM Report 03-07, May 2003, pp. 1-14.

European Search Report issued in corresponding application, EP 10 15 4536, having a mailing date of Apr. 8, 2011.

Korean Notice of Allowance in KR 10-2009-0018603, dated Oct. 24, 2011 (Song et al.).

Second Chinese Office Action in CN 201010129823.6, dated Mar. 8, 2013, with English translation (Song, et al.).

\* cited by examiner

MEMBRANE-ELECTRODE ASSEMBLY FOR FUEL CELL AND FUEL CELL STACK WITH THE SAME

BACKGROUND

1. Field

Embodiments relate to a membrane-electrode assembly for a fuel cell and a fuel cell stack including the same.

2. Description of the Related Art

A fuel cell is a generation system that directly converts chemical reaction energy of hydrogen contained in hydrocarbon-based fuel and separately supplied oxygen into electrical energy.

The fuel cell may be configured as, e.g., a polymer electrolyte membrane fuel cell (PEMFC), a direct oxidation fuel cell (DOFC), etc.

The polymer electrolyte fuel cell may have a fuel cell body called a stack (referred to as 'stack', hereinafter), and may have a structure in which electrical energy is generated according to an electrical-chemical reaction between hydrogen (which may be supplied from a reformer) and oxygen (which may be supplied by actuating an air pump or fan).

The direct oxidation fuel cell may receive fuel directly, i.e., without using hydrogen gas. A hydrogen component of the fuel and separately supplied oxygen may be electrically and chemically reacted to generate electrical energy.

The stack may have a few or scores of unit cells, each having a membrane electrode assembly (MEA) and a separator (also called a bipolar plate).

The above information disclosed in this Background section is only for enhancement of understanding of the background of the invention, and therefore it may contain information that does not form the prior art that is already known to a person of skill in the art.

SUMMARY

Embodiments are therefore directed to a membrane-electrode assembly for a fuel cell and a fuel cell stack including the same, which substantially overcome one or more of the problems due to the limitations and disadvantages of the related art.

It is therefore a feature of an embodiment to provide a membrane-electrode assembly configured to transfer water from a central area, a fuel cell stack and fuel cell including the same, and associated methods.

It is therefore another feature of an embodiment to provide a membrane-electrode assembly configured to maintain sufficient water in a central area so as to provide water retention for an electrolyte membrane, a fuel cell stack and fuel cell including the same, and associated methods.

At least one of the above and other features and advantages may be realized by providing a membrane-electrode assembly (MEA) for a fuel cell, including fuel cell electrolyte membrane, an anode disposed at a first side of the electrolyte membrane, and a cathode disposed at a second side of the electrolyte membrane. The cathode may have a thickness and an area, the cathode area extending in a plane substantially parallel to a major surface of the electrolyte membrane, the cathode area may include a central area and a peripheral area, the peripheral area extending to lateral edges of the cathode, the central area may include hydrophilic portions and hydrophobic portions, the peripheral area may include hydrophilic portions and hydrophobic portions, and the central area may be more hydrophobic than the peripheral area.

An area density of the hydrophobic portions in the central area may be higher than that of the hydrophobic portions in the peripheral area.

The area density of the hydrophobic portions may gradually decrease from the central area to the peripheral area.

An area density of the hydrophobic portions in the central area is substantially identical to that of the hydrophobic portions in the peripheral area.

The hydrophobic portions in the central area may be more strongly hydrophobic than the hydrophobic portions in the peripheral area.

The hydrophilic portions in the peripheral area may be more strongly hydrophilic than the hydrophilic portions in the central area.

An interval between the hydrophobic portions in the central area may be smaller than an interval between hydrophobic portions in the peripheral area.

The hydrophobic portions in the central area may have a same width as the hydrophobic portions in the peripheral area.

Intervals between the hydrophobic portions may decrease monotonically from the central area to the peripheral area.

A width of the hydrophobic portions in the central area may increase from a first dimension to a second dimension, and the hydrophobic portions in the peripheral area may have a width substantially equal to the second dimension.

A width of the hydrophobic portions may monotonically increase moving along a radius of the central area toward the peripheral area, and a width of the hydrophobic portions in the peripheral area may be substantially constant.

A width of the hydrophobic portions may decrease from the central area to the peripheral area.

The width of the hydrophobic portions may decrease monotonically from the central area to the peripheral area.

The hydrophobic portions may form a continuous spiral from the central area to the peripheral area.

A plurality of hydrophobic portions may extend as continuous radial members from the central area to the peripheral area.

The hydrophobic portions may be discrete unit areas, and a number of the discrete unit areas per unit area of the cathode may increase from the central area to the peripheral area.

The cathode may further include a cathode catalyst layer in contact with the electrolyte membrane, and a cathode gas diffusion layer at an outer side of the cathode catalyst layer, and the gas diffusion layer may include a hydrophobic portion and a hydrophilic portion.

The cathode may further include a cathode catalyst layer in contact with the electrolyte membrane, and a cathode gas diffusion layer at an outer side of the cathode catalyst layer, the cathode gas diffusion layer may include a black layer and a micro-porous layer (MPL), and the MPL may include a hydrophobic porous layer and a hydrophilic porous layer.

The peripheral area may completely surround the central area.

At least one of the above and other features and advantages may also be realized by providing a fuel cell stack, including a plurality of electricity generating units, and a pressing plate configured to press the electricity generating units together. Each of the electricity generating units may include a fuel cell electrolyte membrane, an anode disposed at a first side of the electrolyte membrane, and a cathode disposed at a second side of the electrolyte membrane. The cathode may have a thickness and an area, the cathode area extending in a plane substantially parallel to a major surface of the electrolyte membrane, the cathode area may include a central area and a peripheral area, the peripheral area extending to lateral edges of the cathode, the central area may include hydrophilic portions and hydrophobic portions, the peripheral area may include hydrophilic portions and hydrophobic portions, and the central area may be more hydrophobic than the peripheral area.

At least one of the above and other features and advantages may also be realized by providing a method of fabricating a fuel cell, the method including providing a plurality of electricity generating units, mechanically and electrically coupling the electricity generating units to one another, and coupling a fuel supply for supplying a hydrogen-containing fuel and an oxidizer supply for supplying an oxygen-containing oxidizer to the electricity generating units. Each of the electricity generating units may include a fuel cell electrolyte membrane, an anode disposed at a first side of the electrolyte membrane, and a cathode disposed at a second side of the electrolyte membrane. The cathode may have a thickness and an area, the cathode area extending in a plane substantially parallel to a major surface of the electrolyte membrane, the cathode area may include a central area and a peripheral area, the peripheral area extending to lateral edges of the cathode, the central area may include hydrophilic portions and hydrophobic portions, the hydrophobic portions in the central area may be more strongly hydrophobic than the hydrophobic portions in the peripheral area, and the area density of the hydrophobic portions in the central area may be higher than that of the hydrophobic portions in the peripheral area.

BRIEF DESCRIPTION OF THE DRAWINGS

The above and other features and advantages will become more apparent to those of ordinary skill in the art by describing in detail example embodiments with reference to the attached drawings, in which.

DETAILED DESCRIPTION

Figure 1:
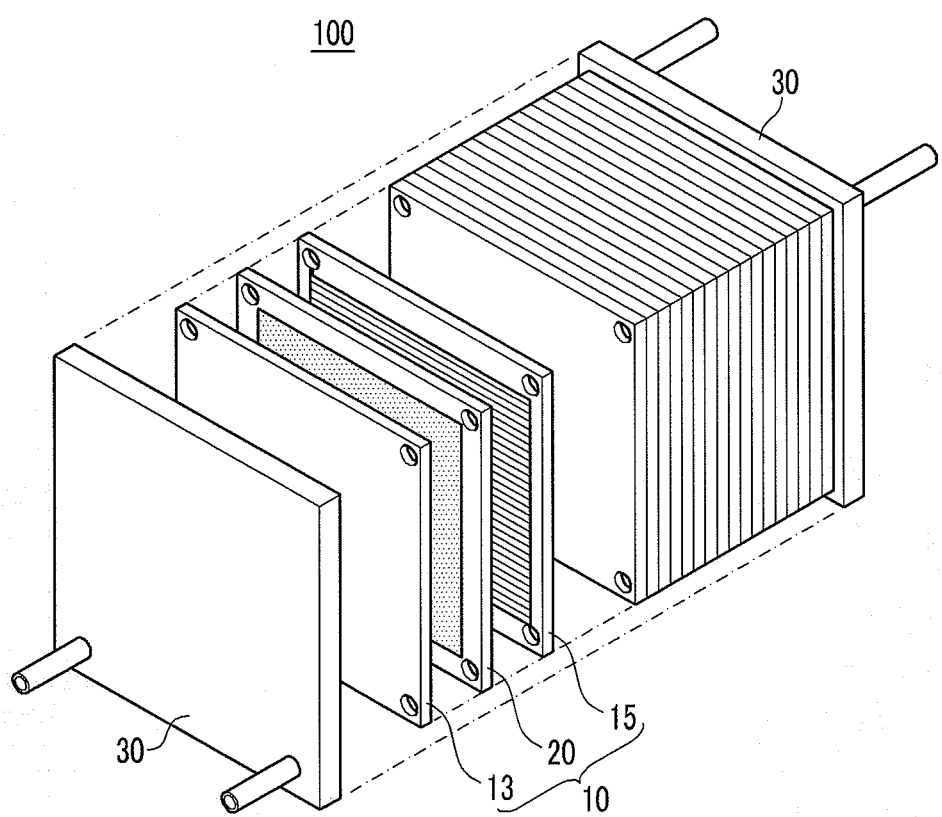
FIG. 1 illustrates an exploded perspective view of a fuel cell stack according to a first example embodiment.

Korean Patent Application No. 10-2009-0018603, filed on Mar. 4, 2009, in the Korean Intellectual Property Office, and entitled: "Membrane-Electrode Assembly for Fuel Cell and Fuel Cell Stack with the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Herein, hydrophobic treatment refers to coating a surface with a material having a hydrophobic property or forming a hydrophobic region by adding a material that is hydrophobic. Hydrophilic treatment refers to coating a surface with a material having a hydrophilic property or forming a hydrophilic region by adding a material that is hydrophilic.

Figure 2:
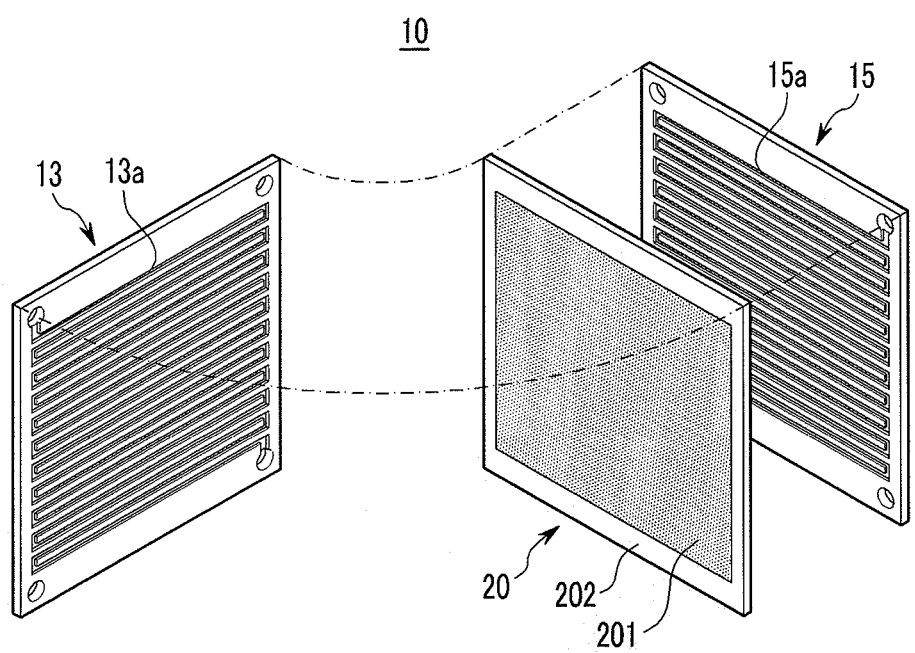
FIG. 2 illustrates an exploded perspective view of the configuration of an electricity generating unit of FIG. 1.

FIG. 1 illustrates an exploded perspective view of a fuel cell stack according to a first example embodiment. FIG. 2 illustrates an exploded perspective view of the configuration of an electricity generating unit of FIG. 1.

With reference to FIGS. 1 and 2, a fuel cell stack 100 according to a first embodiment may include electricity generating units 10 in units of cells that generate electrical energy by making fuel and oxygen react with each other.

In the present example embodiment, the plurality of electricity generating units 10 may be successively disposed, so as to form the fuel cell stack 100 with an assembly of the electricity generating units 10.

Fuel used for the fuel cell stack 100 may include hydrogen-contained liquid or gas fuel such as methanol, ethanol, LPG, LNG, gasoline, butane gas, and the like. In this case, the fuel cell stack 100 may be configured as a direct oxidation fuel cell that generates electrical energy through a direct reaction between liquid or gas fuel by the electricity generating units 10 and oxygen.

Alternatively, the fuel cell stack 100 according to an example embodiment may use hydrogen cracked from liquid or gas fuel through a general reformer as fuel. In this case, the fuel cell stack 100 may be configured as a polymer electrolyte fuel cell that generates electrical energy through a reaction between hydrogen and oxygen by the electricity generating units 10.

The fuel cell stack 100 according to the present example embodiment may use pure oxygen stored in a storage unit as oxygen reacting with fuel, or may use air that contains oxygen natively.

In the fuel cell stack 100, the electricity generating unit may include a membrane-electrode assembly (MEA) 20 and separators (also called bipolar plates) 13 and 15 tightly attached to both surfaces of the MEA 20. A plurality of electricity generating units 10 may be provided to form the laminated fuel cell stack 100 according to the present example embodiment.

A pressing plate 30 may be positioned at the outermost portions of the fuel cell stack 100 to tightly attach the plurality of electricity generating units 10. In an implementation, the separators 13 and 15 positioned at the outermost portions of the plurality of electricity generating units 10 serve as the pressing plates. Also, the pressing plates 30 may be configured to have the function of the separators 13 and 15, besides the function of tightly attaching the plurality of electricity generating units 10.

The separators 13 and 15 may be disposed to be tightly attached with the MEA 20 interposed therebetween to form a hydrogen passage 13a and an air passage 15a at respective sides of the MEA 20. The hydrogen passage 13a may be positioned at the side of an anode 26 (as described below) of the MEA 20, and the air passage 15a is positioned at the side of a cathode 27 (as described below) of the MEA 20.

The hydrogen passage 13a and the air passage 15a may be disposed in a straight line state at predetermined intervals on the separators 13 and 15, and may be substantially formed in zigzags with both ends thereof alternately connected. However, the structures and orientations of the hydrogen passage 13a and the air passage 15a are not limited thereto.

The MEA 20 interposed between the both separators 13 and 15 may include an active area 201 with a certain area where an oxidation/reduction reaction occurs, and a non-active area 202 connected with edge portions of the active area 201. A gasket (not shown) may be installed at the non-active area 202 to seal the edge portions of tightly attached faces of the separators 13 and 15 corresponding to the active area 201.

When the fuel cell operates, water is generated due to oxygen reduction reaction by a cathode of the MEA. If the water is not properly discharged, a flooding phenomenon may occur, whereby oxidant gas is hindered from diffusing. However, the electrolyte membrane and the cathode catalyst layers should maintain a certain amount of water retention to improve generation efficiency. Thus, maintaining water retention of the electrolyte membrane and the cathode catalyst layers without the flooding phenomenon may help ensure effective generation. However, it will be appreciated that these requirements may be in conflict. Embodiments described herein are directed to providing a proper balance of these requirements.

Figure 3:
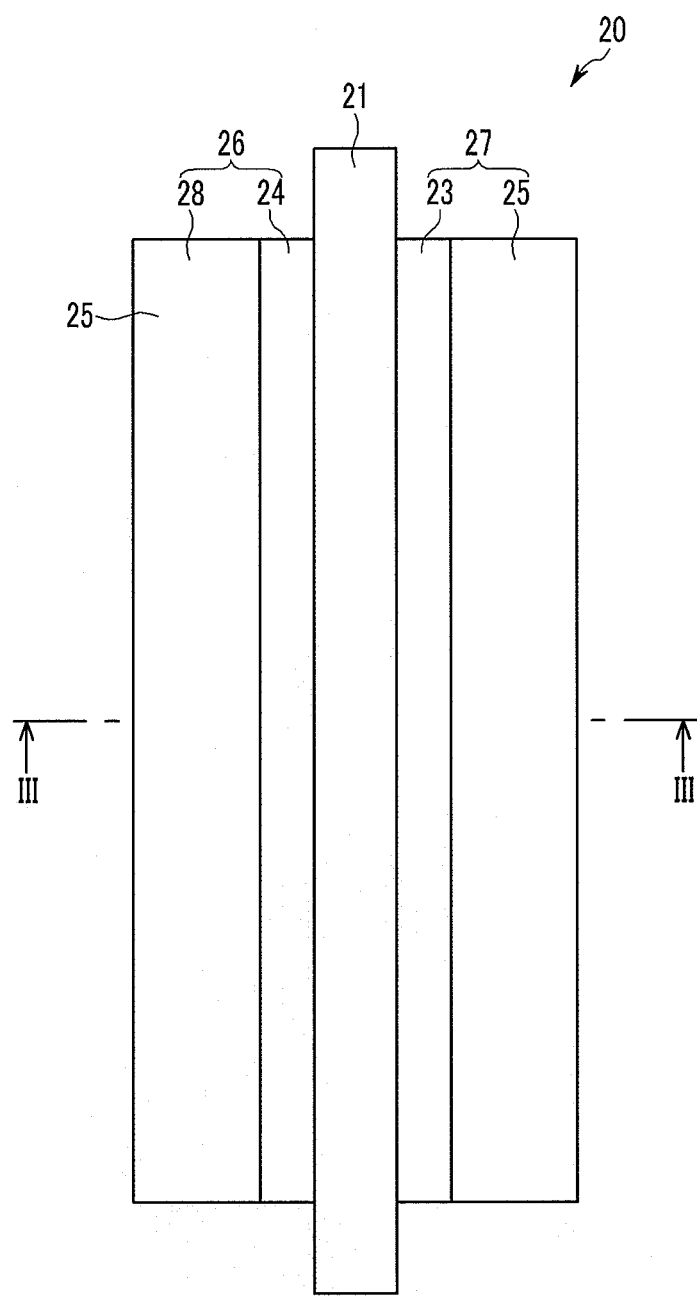
FIG. 3 illustrates a side view of a membrane-electrode assembly (MEA) according to the first embodiment.
Figure 4:
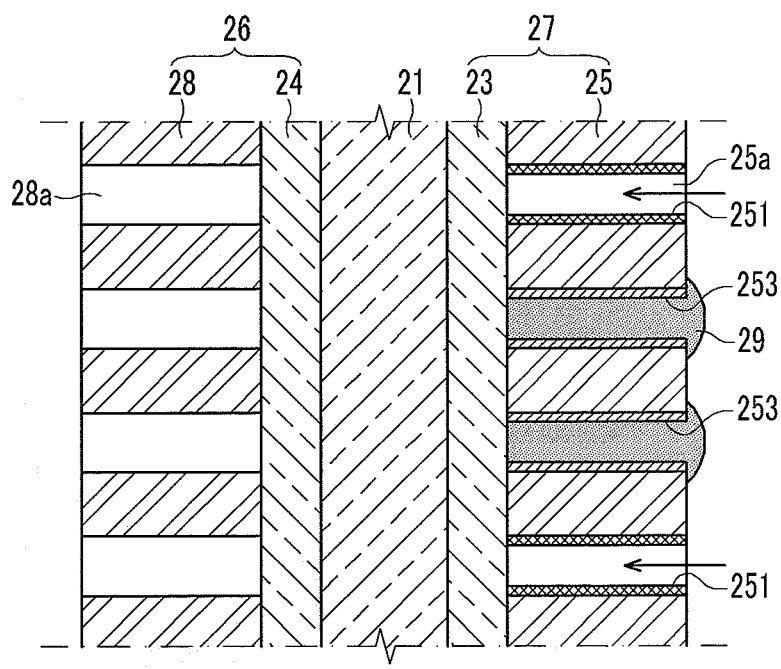
FIG. 4 illustrates a cross-sectional view of the MEA taken along line III-III in FIG. 3.

FIG. 3 illustrates a side view of a membrane-electrode assembly (MEA) according to the first embodiment. FIG. 4 illustrates a cross-sectional view of the MEA taken along line in FIG. 3.

With reference to FIGS. 3 and 4, the MEA 20 has a structure in which the anode 26 and the cathode 27 are provided on respective surfaces of the active area 201, and an electrolyte membrane 21 is provided between the two electrodes 26 and 27.

The electrolyte membrane 21 may be made of solid polymer electrolyte with a thickness of, e.g., about 5 μm to about 200 μm, enabling ion exchange of moving hydrogen ions generated from an anode catalyst layer 24 to a cathode catalyst layer 23. In order to effectively perform the ion exchange, the electrolyte membrane 21 should have a certain amount of water retention.

The anode 26 forming one surface of the MEA 20 may receive hydrogen gas via the hydrogen passage 13a formed between the separator 13 and the MEA 20, includes an anode gas diffusion layer (GDL) 28 and the anode catalyst layer 24.

The anode GDL 28 may be made of, e.g., carbon paper or carbon cloth, and may include a plurality of holes 28a. Also, the anode GDL 28 supplies hydrogen gas, which has been transferred via the hydrogen passage 13a, to the anode catalyst layer 24 via the holes 28a. The anode catalyst layer 24 oxidizes the hydrogen gas to allow converted electrons to move to the cathode 27 via the neighboring separator 15, and the generated hydrogen ions to move to the cathode 27 via the electrolyte membrane 21. The electricity generating units 10 generate electrical energy with the flow of the electrons.

The cathode 27, to which the hydrogen ions that have been generated from the anode are moved via the electrolyte membrane 21, is the part that receives oxygen-containing air via the air passage 15a formed between the separator 15 and the MEA 20. The cathode 27 may include a cathode gas diffusion layer (GDL) 25 and the cathode catalyst layer 23.

The cathode GDL 25 may be made of, e.g., carbon paper or carbon cloth, and may include a plurality of holes 25a. The cathode GDL 25 supplies air, which is transferred via the air passage 15a, to the cathode catalyst layer 23 via the holes 25a.

The cathode catalyst layer 23 generates heat and water of a certain temperature by chemical reduction-oxidation (redox) of the hydrogen ions and electrons moved from the anode 26 with oxygen in the air.

Figure 5:
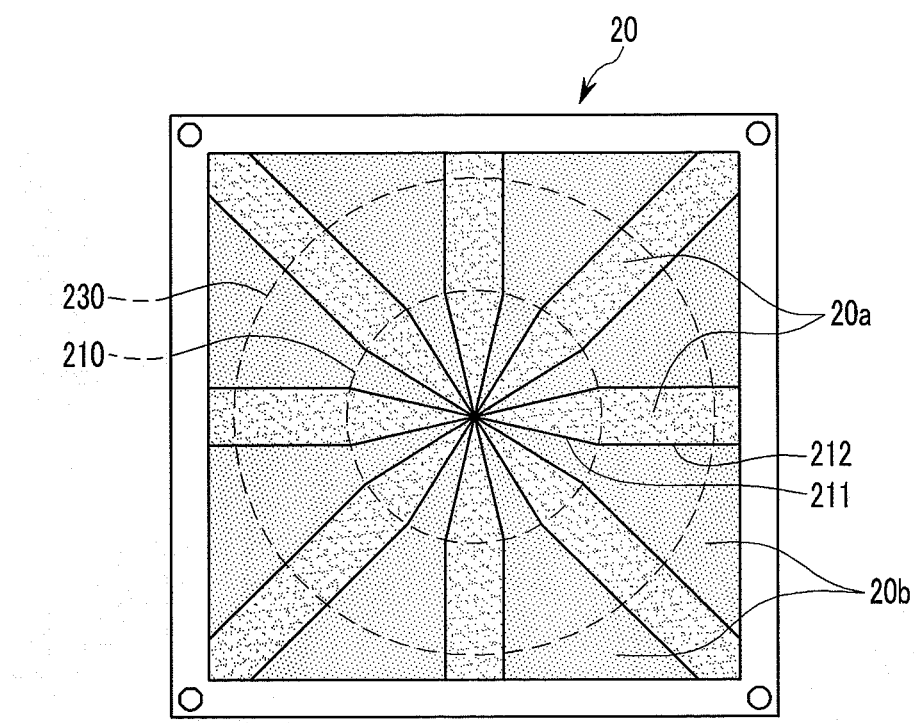
FIG. 5 illustrates a front view of the MEA according to the first example embodiment.

FIG. 5 illustrates a front view of the MEA according to the first example embodiment.

With reference to FIGS. 4 and 5, the cathode 27 includes hydrophobic-treated hydrophobic portions 20a and hydrophilic-treated hydrophilic portions 20b configured so as to easily discharge moisture while maintaining an appropriate degree of water retention. As described in detail below, the cathode 27 may have a greater area density of hydrophobic portions 20a in a central area (inner area 210) than in a peripheral area (outer area 230), such that water, which a byproduct of the electricity-producing reactions, is drawn from the center of the cathode to the periphery. As is also described below, the cathode 27 may have hydrophobic portions 20a that are more strongly hydrophobic in the inner area 210 than in the outer area 230, i.e., the hydrophobic portions 20a in the central area 210 may have a greater hydrophobicity per unit area so that they more strongly repel water than the hydrophobic portions 20a in the outer area 230 for a given unit area. This may be achieved by, e.g., forming the hydrophobic portions 20a in the central area 210 using a greater fraction of hydrophobic material to base material, or using a more hydrophobic material for the hydrophobic portions 20a in the central area 210, etc. Further, in the inner area 210, a combination of greater area density of the hydrophobic portions 20a and greater hydrophobicity per unit area may be used.

In an implementation, a hydrophilic film 253 and a hydrophobic film 251 may be coated on the cathode gas diffusion layer 25, and the hydrophobic portions 20a with the hydrophobic film 251 coated thereon may be disposed between the hydrophilic portions 20b with the hydrophilic film 253 coated thereon. As shown in FIG. 4, water 29 may be attracted to the hydrophilic film 253. As the material of the hydrophilic film 253 and the hydrophobic film 251, generally, various materials having a hydrophilic property or a hydrophobic property may be used.

The hydrophobic portions 20a may be formed in a regular pattern. For example, as shown in FIG. 5, the regions connected from the center of the MEA 20 to an outer side may be radially disposed at equal intervals.

In this case, the density of the hydrophobic portions 20a at an inner area 210 adjacent to the center of the cathode 27 is higher than that at an outer area 230 positioned at an outer side of the inner area 210. Herein, the density of the hydrophobic portions 20a refers to a ratio of the area occupied by the hydrophobic portions 20a to the entire area. The inner area 210 and the outer area 230 may be variably set according to the size and operation conditions of the fuel cell stack 100.

In the present example embodiment, the hydrophobic portions 20a may each include a variable width portion 211 (having a width gradually increasing toward the outer side) and an equal width portion 212 (positioned at an outer side of the variable width portion 211 and having a uniform width). The variable width portion 211 may be positioned at the inner area 210 and the equal width portion 212 may be positioned at the outer area 230.

The density of the hydrophobic portions 20a may be substantially uniform at the area where the variable width portions 211 are positioned. The density of the hydrophobic portions 20a may be gradually reduced at the area where the equal width portions 212 are positioned, because the entire area increases in proportion to the square of the distance as it becomes away from the center of the cathode 27, but the hydrophobic portions 20a at the equal width portions 212 maintain a certain area.

Figure 6A:
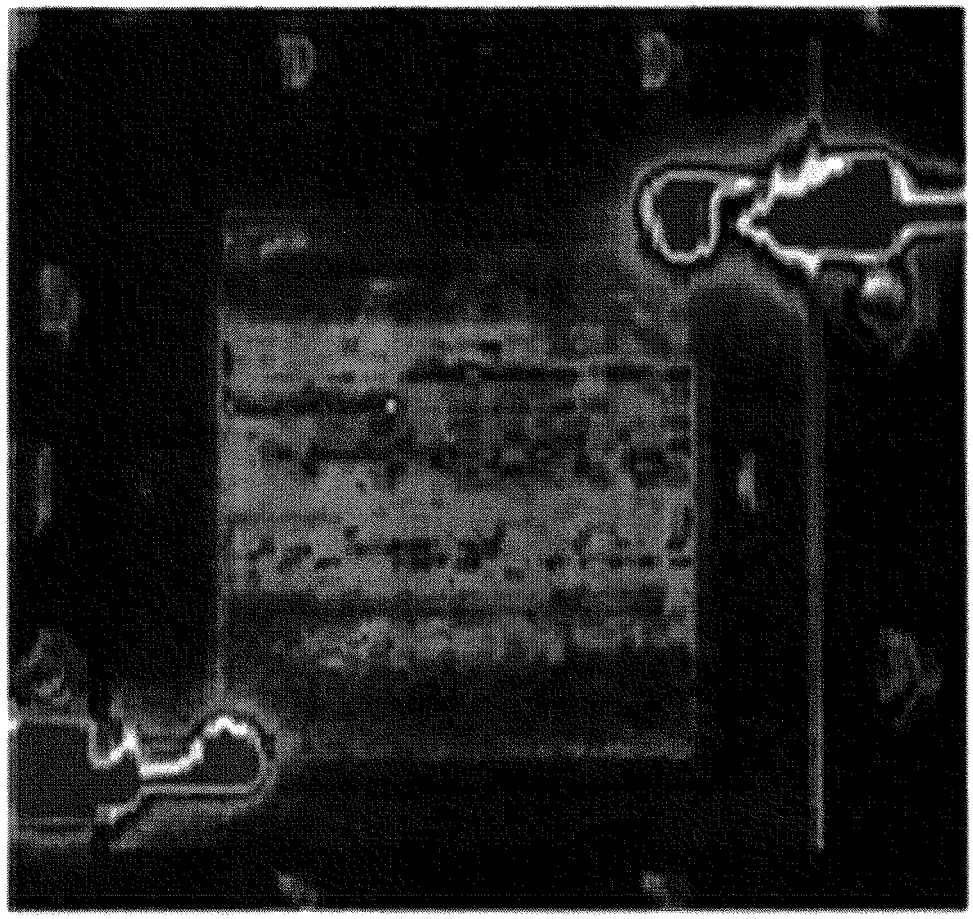
FIG. 6A is a photograph illustrating a distribution of moisture generated when current is produced at 100 mA per $cm^2$.
Figure 6B:
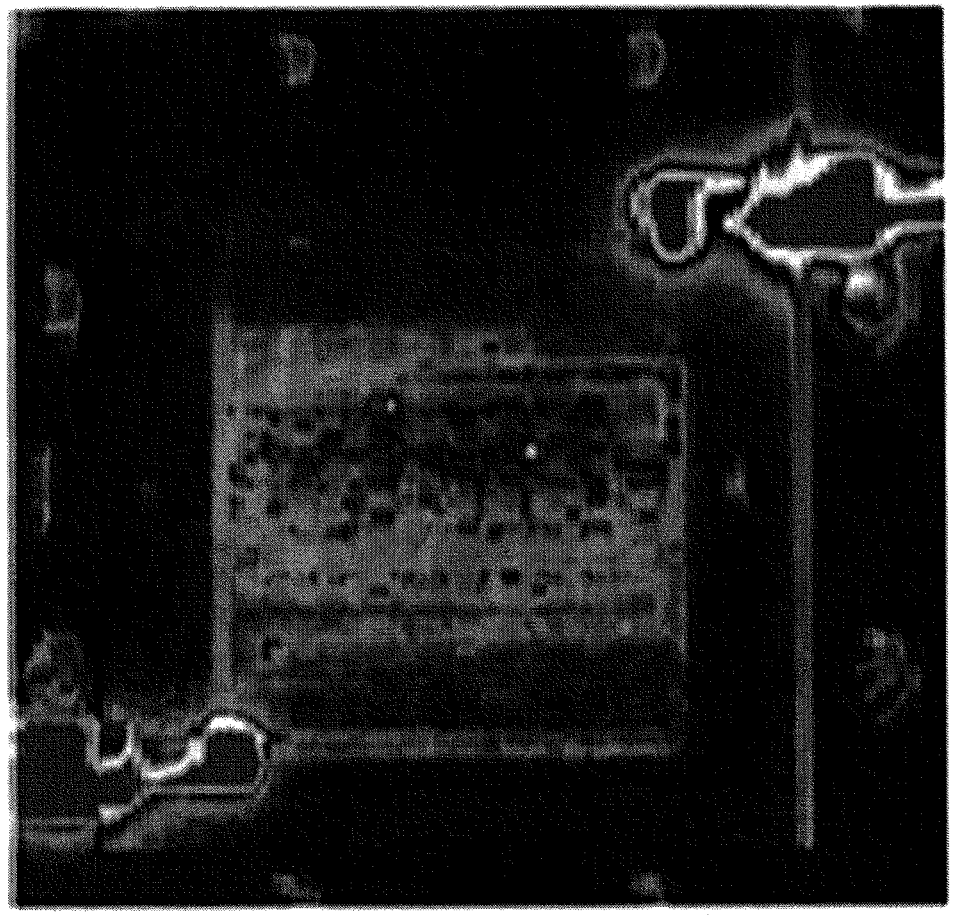
FIG. 6B is a photograph illustrating a distribution of moisture generated when current is produced at 300 mA per $cm^2$.

FIG. 6A is a photograph showing a distribution of moisture generated when current is produced at 100 mA per $cm^2$, and FIG. 6B is a photograph showing a distribution of moisture generated when current is produced at 300 mA per $cm^2$.

In FIGS. 6A and 6B, air is supplied from an upper portion and fuel is supplied at a lower portion. In this respect, however, even when fuel is supplied from the upper portion and air is supplied from the lower portion, the same results may be obtained.

As shown in FIGS. 6A and 6B, a relatively greater amount of moisture is generated at the central portion of the MEA. This is because air supplied from the upper portion and fuel supplied from the lower portion meet at the central portion to react with each other. Thus, if the moisture generated at the central portion is not properly discharged, a flooding phenomenon would occur to degrade generation efficiency.

In this case, however, in the present example embodiment, because the density of the hydrophobic portions 20a at the inner area 210 is higher than that of the hydrophobic portions 20a at the outer area 230, the relatively greater amount of moisture generated at the inner area may be effectively discharged to allow air to easily move to the cathode catalyst layer. The moisture released from the hydrophobic portions 20a may be discharged to outside via the air passage 15a of the separator 15. In addition, because the hydrophobic portions 20a are also formed at the outer area 230, as well as at the inner area 210, but with a relatively low density, the electrolyte membrane 21 may have appropriate water retention, thus improving the generation efficiency.

In the first example embodiment, both the hydrophobic portions 20a and the hydrophilic portions 20b are formed, but embodiments are not limited thereto, e.g., only the hydrophobic portions 20a may be formed. In this regard, the density of the hydrophobic portions 20a is higher at the inner area 210 than at the outer area 230. Thus, even if only the hydrophobic portions 20a are formed, because the density of the hydrophobic portions 20a at the outer area 230 is low, appropriate moisture can be maintained. Further, at the inner area, although the density of the hydrophobic portions 20a is high, because the greater amount of moisture is generated, an appropriate amount of moisture can be maintained.

Figure 7:
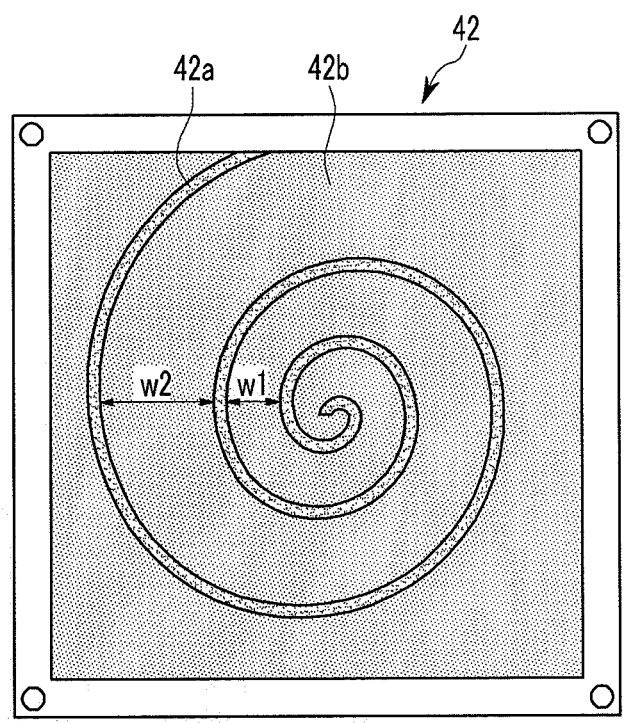
FIG. 7 illustrates a front view of an MEA according to a second example embodiment.

FIG. 7 illustrates a front view of an MEA according to a second example embodiment.

With reference to FIG. 7, an MEA 42 may include a hydrophobic-treated hydrophobic portion 42a and a hydrophilic-treated hydrophilic portion 42b formed between the hydrophobic portions 42a. The hydrophobic portion 42a may have a pattern in a spiral shape connected from the center to an edge portion in a rotational manner as a curved line.

The hydrophobic portion 42a may be formed such that the interval 'w' between the hydrophobic portions 42a increases as it goes from the center of the cathode to an outer side. For example, where the interval between the hydrophobic portions at an inner area is 'w1' and the interval between hydrophobic portions at an outer area formed at an outer side of the inner area is 'w2', w2 is larger than w1. Accordingly, the density of the hydrophobic portions at the central area is higher than that of the hydrophobic portions at the outer area, and thus, a relatively greater amount of moisture generated at the inner area can be easily discharged. Further, a combination of greater area density of the hydrophobic portions 42a and greater hydrophobicity per unit area may be used in the central area.

Figure 8:
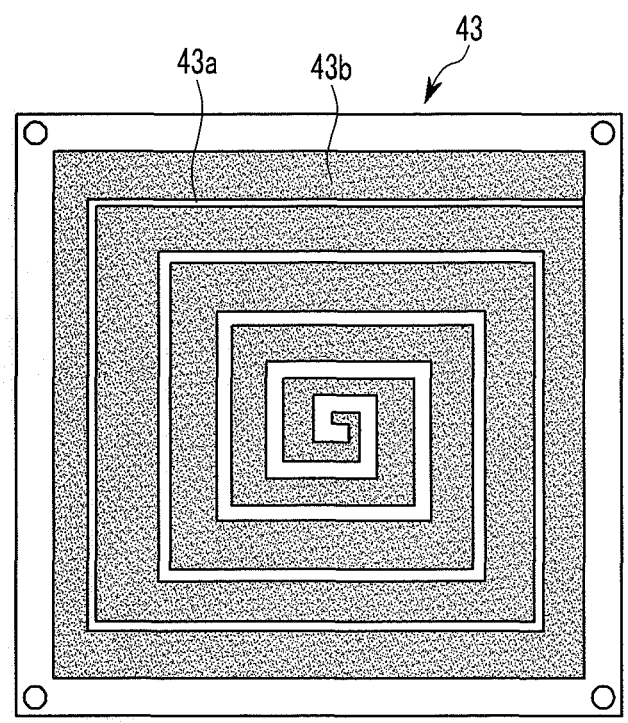
FIG. 8 illustrates a front view of an MEA according to a third example embodiment.

FIG. 8 illustrates a front view of an MEA according to a third example embodiment.

With reference to FIG. 8, an MEA 43 may include a hydrophobic-treated hydrophobic portion 43a and a hydrophilic portion 43b formed to be adjacent to the hydrophobic portion 43a and treated to be hydrophilic.

In the present example embodiment, the hydrophobic portion 43a proceeds from the center of the MEA 43 in a straight line and an angle, which is repeated several times in a rotational manner until it reaches an outer side. The width of the hydrophobic portion 43a may be gradually reduced toward the outside. Accordingly, the density of the hydrophobic portions 43a can be made higher at an inner area than at an outer area, and thus, a relatively greater amount of moisture generated at the inner area can be easily discharged. Further, a combination of greater area density of the hydrophobic portions 43a and greater hydrophobicity per unit area may be used in the central area.

Figure 9:
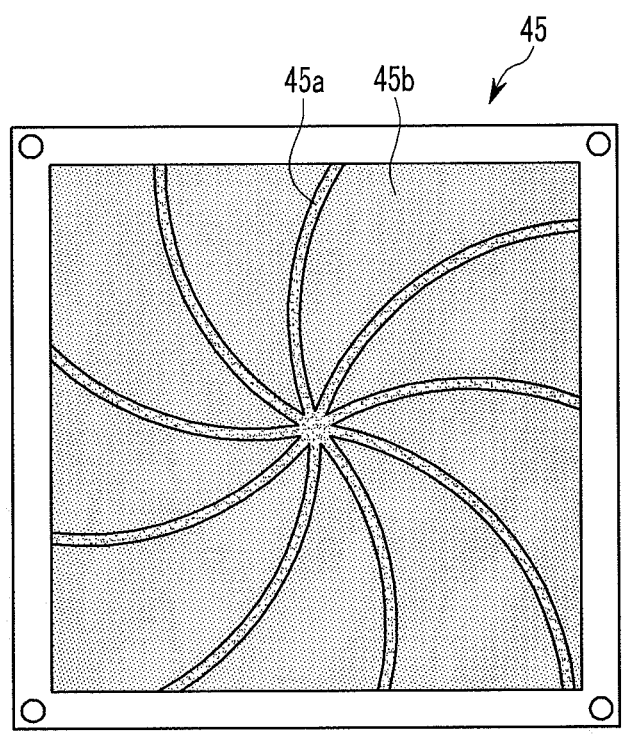
FIG. 9 illustrates a front view of an MEA according to a fourth example embodiment.

FIG. 9 illustrates a front view of an MEA according to a fourth example embodiment With reference to FIG. 9, an MEA 45 according to the fourth example embodiment may include hydrophobic-treated hydrophobic portions 45a and hydrophilic portions 45b formed to be adjacent to the hydrophobic portions 45a and treated to be hydrophilic.

In the present example embodiment, the hydrophobic portions 45a may be formed to be connected in an arc shape from the center of the MEA 45 to an outer side, and a plurality of hydrophobic portions 45a may be disposed at equal intervals. The hydrophobic portions 45a may be formed to be connected with the same width from the center of the MEA to the outer side. Thus, the density of the hydrophobic portions 45a at an inner area is higher than that of the hydrophobic portions 45a at an outer area positioned at an outer side of the inner area. The area of the MEA increases in proportion to the square of the distance as it goes from the inner side to the outer side, but the area of the hydrophobic portions 45a does not increase. Thus, the density of the hydrophobic portions 45a is gradually reduced toward the outer side. Accordingly, the relatively greater moisture generated at the inner area can be easily discharged and appropriate moisture can be maintained, improving the generation efficiency. Further, a combination of greater area density of the hydrophobic portions 45a and greater hydrophobicity per unit area may be used in the central area.

Figure 10:
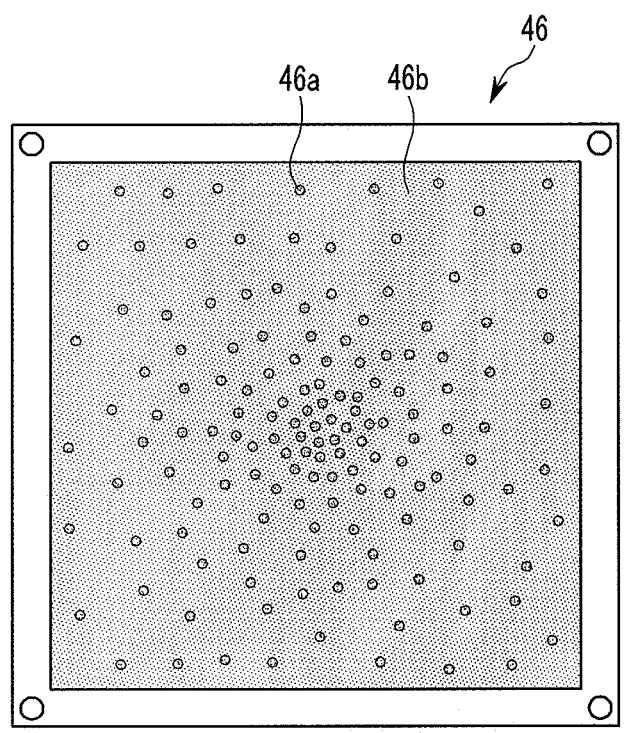
FIG. 10 illustrates a front view of an MEA according to a fifth example embodiment.

FIG. 10 illustrates a front view of an MEA according to a fifth example embodiment.

With reference to FIG. 10, an MEA 46 according to the fifth embodiment may include hydrophobic-treated hydrophobic portions 46a and hydrophilic portions 46b disposed to be adjacent to the hydrophobic portions 46a and treated to be hydrophilic.

The hydrophobic portions 46a may be formed as a plurality of discrete unit areas, i.e., unit areas that are spaced apart from each other. A larger number of hydrophobic portions 46 per unit area are positioned at an inner area of the MEA 46, and a smaller number of hydrophobic portions 46a per unit area are positioned at an outer area of the MEA 46.

In the present example embodiment, the hydrophobic portions 46a have a circular shape, but the embodiments are not limited thereto. The hydrophobic portions 46a may have various other shapes such as an oval or polygonal shape. Further, the size of the discrete unit areas may be varied, e.g., so that a larger size unit area is employed at the central area of the cathode and a smaller size unit area is employed at the peripheral area of the cathode.

In the present example embodiment, the density of the hydrophobic portions 46a at the inner area is higher than that of the hydrophobic portions 46a at the outer area, so a relatively greater amount of moisture generated at the inner area can be easily discharged and appropriate moisture can be maintained, improving the generation efficiency. Further, a combination of greater area density of the hydrophobic portions 46a and greater hydrophobicity per unit area may be used in the central area.

Figure 11:
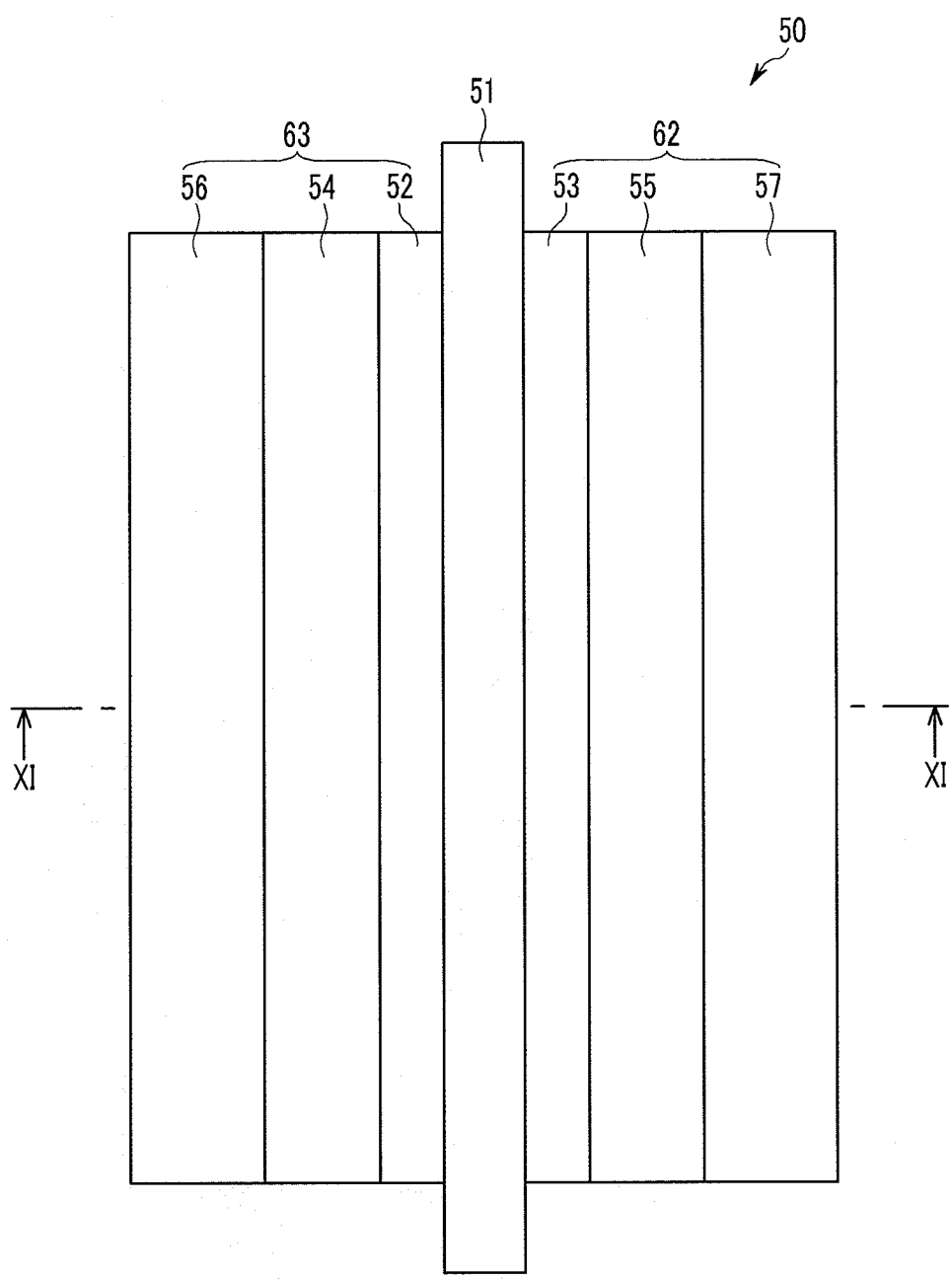
FIG. 11 illustrates a side view of an MEA according to a sixth example embodiment.
Figure 12:
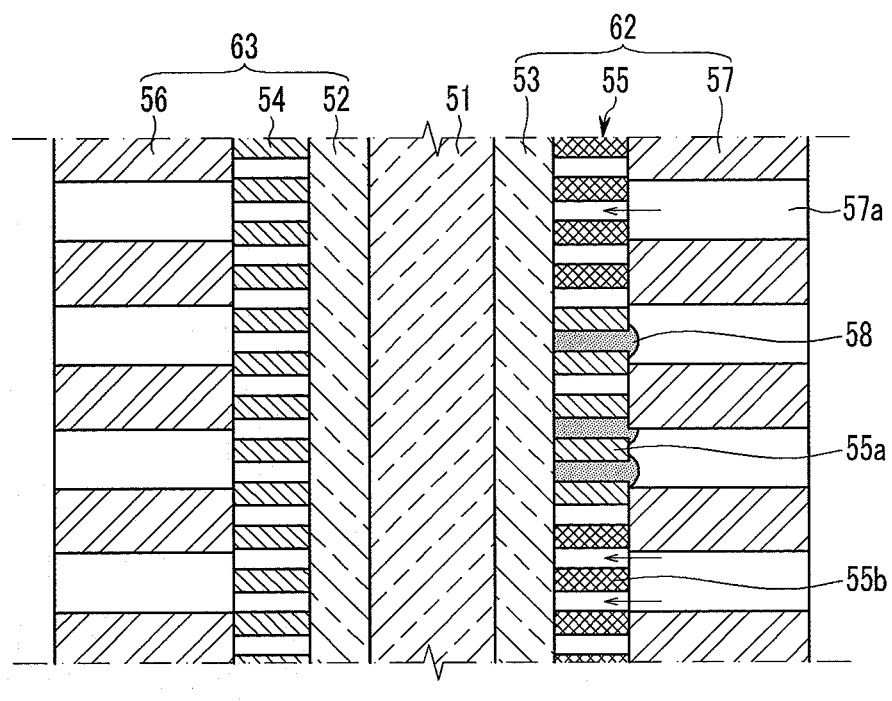
FIG. 12 illustrates a sectional view taken along line X-X in FIG. 10.

FIG. 11 illustrates a side view of an MEA according to a sixth example embodiment. FIG. 12 illustrates a sectional view taken along line X-X in FIG. 10.

With reference to FIGS. 11 and 12, an MEA 50 according to the sixth example embodiment includes an anode 63, a cathode 62, and an electrolyte membrane 51 interposed between the two electrodes 62 and 63.

The MEA according to the present example embodiment has the same structure as that of the MEA according to the first example embodiment, except that the gas diffusion layer includes micro-porous layers 54 and 55 and black layers 56 and 57, so a detailed explanation of the structures described above may be omitted in order to avoid repetition.

The anode 63 forming one surface of the MEA 50 may include an anode catalyst layer 52 in contact with one surface of the electrolyte membrane 51, and an anode black layer 56 and an anode micro-porous layer (MPL) 54 formed at an outer side of the anode catalyst layer 52.

The anode MPL 54 may be positioned between the anode catalyst layer 52 and the anode black layer 56, and the anode MPL 54 and the anode black layer 56 may constitute an anode gas diffusion layer (GDL).

The cathode 62 may include a cathode catalyst layer 53 in contact with one surface of the electrolyte membrane 51, and a cathode black layer 57 and a cathode MPL 55 formed at an outer side of the cathode catalyst layer 53.

The cathode MPL 55 may be positioned between the cathode catalyst layer 53 and the cathode black layer 57, and the cathode MPL 55 and the cathode black layer 57 may constitute a cathode GDL.

The anode black layer 56 and the cathode black layer 57 may be made of, e.g., carbon paper or carbon cloth, and may include holes formed therein.

The anode MPL 54 and the cathode MPL 55 may be made of, e.g., graphite, carbon nano-tubes (CNT), fullerene (C60), active carbon, carbon nano-horns, or the like, and may include a plurality of holes that are smaller than those formed in the black layers 56 and 57. The MPLs 54 and 55 may enhance gas distribution to the catalyst layers 52 and 53.

The cathode black layer 57 transfers air that has been transferred via an air passage to the cathode MPL 55 via the holes 57a, and the cathode MPL 55 greatly distributes the transferred air to supply it to the cathode catalyst layer 53. The cathode catalyst layer 53 generates heat and water of a certain temperature by reduction-reacting hydrogen ions and electrons moved from the anode 63 with oxygen in the air.

In order to easily discharge the generated water, the cathode MPL 55 includes hydrophilic porous layers 55a and hydrophobic porous layers 55b. The hydrophilic porous layers 55a are positioned between the hydrophobic porous layers 55b, and the hydrophobic porous layers 55b may be formed with a regular pattern. The hydrophobic porous layers 55b may be formed by adding a hydrophobic material to a slurry for formation of the cathode MPL 55 and then patterning the slurry with an inkjet or according to various printing methods. Also, the hydrophilic porous layers 55a may be formed by adding a hydrophilic material to a slurry for formation of the cathode MPL 55, and then patterning the slurry with an inkjet or according to various printing methods.

The thusly-formed hydrophilic porous layers 55a and the hydrophobic porous layers 55b have a hydrophilic property or a hydrophobic property throughout their entirely, and not only at their surfaces. In the present example embodiment, the hydrophilic porous layers 55a form a hydrophilic portion and the hydrophobic porous layers 55b form a hydrophobic portion, allowing the cathode MPL 55 to discharge or contain moisture, and thus, moisture can be more easily adjusted. Water introduced into the hydrophobic porous layers 55b is repelled from the interior of the hydrophobic porous layers 55b, and is thus discharged to the outside, e.g., via the air passage formed at the separator. Accordingly, air can freely move via the hydrophobic porous layers 55a. Water 58 introduced into the hydrophilic porous layers 55a remains in the hydrophilic porous layers 55a and is supplied to the electrolyte membrane, thus improving the water retention of the electrolyte membrane.

In the present example embodiment, the cathode MPL 55 is illustrated to include the hydrophilic portion and the hydrophobic portion, but the embodiments are not limited thereto. For example, the cathode black layer 57, as well as the cathode MPL 55, may be also treated to be hydrophilic or hydrophobic, together. In this case, the hydrophobic portion of the cathode black layer 57 may be formed at a position corresponding to the hydrophobic porous layers 55b, and the hydrophilic portion of the cathode black layer 57 may be formed at a position corresponding to the hydrophilic porous layers 55a.

In the present example embodiment, the density of the hydrophobic porous layers 55b may be higher at an inner area adjacent to the center of the cathode 62 than that at an outer area positioned at an outer side of the inner area. Accordingly, a larger amount of water generated at the inner area can be easily discharged. To this end, the hydrophobic porous layers 55b may be formed with various patterns as described above. Further, a combination of greater area density of the hydrophobic porous layers 55b and greater hydrophobicity per unit area may be used in the central area.

Figure 13:
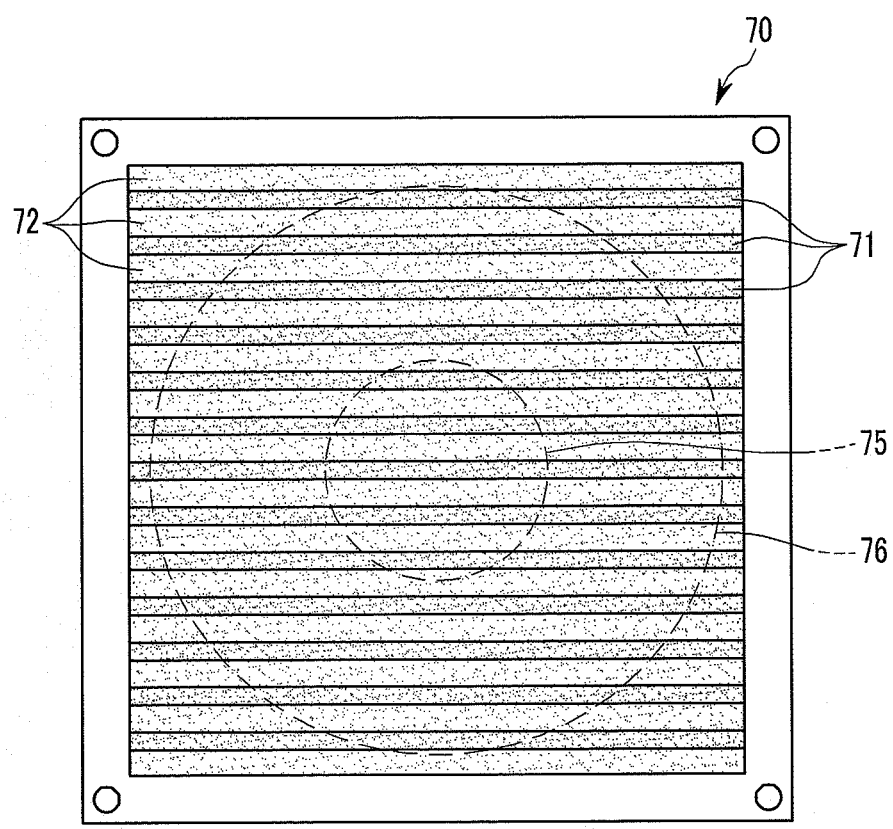
FIG. 13 illustrates a front view of an MEA according to a seventh example embodiment.

FIG. 13 illustrates a front view of an MEA according to a seventh example embodiment.

With reference to FIG. 13, an MEA 70 according to the seventh example embodiment includes an outer area 76 having hydrophobic portions 71 and hydrophilic portions 72, the hydrophilic portions 72 being adjacent to the hydrophobic portions 71. A hydrophobic property of hydrophobic portions 71 in an inner area 75 adjacent to the center of the MEA 70 may be stronger than that of the hydrophobic portions 71 in the outer area 76. In another implementation, a hydrophilic property of hydrophilic portions 72 in the inner area 75 may be less strong than that of the hydrophilic portions 72 in the outer area 76. Thus, the inner area 75 may be made more hydrophobic than the outer area 76, even without using a greater area density of the hydrophobic portions 71 in the inner area 75.

The cathode gas diffusion layer (GDL) may contain a hydrophilic material and a hydrophobic material. Also, a black layer or a micro-porous layer forming the cathode GDL may contain the hydrophobic material or the hydrophilic material, or both layers may contain the hydrophobic material or the hydrophilic material.

The hydrophobic material and the hydrophilic material may include various types of materials, without being particularly limited.

In the present example embodiment, the hydrophobic portions 71 may be formed to be connected from one edge to another edge of the MEA 70, substantially having a rectangular form, i.e., stripes, and rectangular hydrophilic portions 72 may be formed between the hydrophobic portions 71.

The hydrophobic portions 71 and the hydrophilic portions 72 may be disposed at equal intervals. However, a hydrophobic property of the hydrophobic portions 71 may be made stronger at an inner area 75 adjacent to the center of the MEA 70 than that of the hydrophobic portions 71 at an outer area 76 positioned at an outer side of the inner area 75, such that water is repelled from the center of the MEA 70.

In detail the hydrophobic portions 71 at the inner area 75 may contain a larger amount of hydrophobic material per unit area than those at the outer area 76, and the amount of hydrophobic material contained in the hydrophobic portions 71 may be gradually reduced as it goes from the inner side to the outer side. Accordingly, the hydrophobic power of the hydrophobic portions 71 may be gradually reduced as it goes from the inner side to the outer side.

According to the present example embodiment, the density of the hydrophobic portions, i.e., a rate of the hydrophobic portions per unit area, may be constant, while the hydrophobic property of the hydrophobic portions 71 at the inner area 75 is stronger than that of the hydrophobic portions 71 at the outer area 76.

Similarly, the hydrophilic property of the hydrophilic portions 72 positioned at the inner area 75 may be made weaker than that of the hydrophilic portions 72 positioned at the outer area 76. To this end, the hydrophilic portions 72 at the inner area 75 may contain a smaller amount of hydrophilic material per unit area than that of the hydrophilic portions 72 at the outer area 76, and the hydrophilic material contained in the hydrophilic portions 72 may gradually increase as it goes from the inner side to the outer side. Accordingly, the hydrophilic property of the hydrophilic portions 72 may be gradually reduced as it goes from the inner side to the outer side. Thus, a relatively large amount of moisture generated at the inner area 75 can be easily discharged, and the outer area 76 can maintain appropriate moisture, improving the generation efficiency.

As described above, embodiments may provide a fuel cell stack having advantages of maintaining a certain amount of water retention while easily discharging water generated from a membrane electrode assembly (MEA). As one example described above, the density of the hydrophobic portions at the inner area may be higher than that of the hydrophobic portions at the outer area, moisture (which is relatively more heavily generated at the center of the MEA) can be easily discharged, thereby preventing occurrence of a flooding phenomenon. Further, because the density of the hydrophobic portions at the outer area may be relatively low, the hydrophobic portions at the outer area can contain an appropriate amount of moisture to maintain water retention of the electrolyte membrane. In addition, because the hydrophilic portions may be formed adjacent to the hydrophobic portions, the electrolyte membrane may provide a proper degree of water retention, thus improving generation efficiency.

Also, because the hydrophobic film is coated on the cathode gas diffusion layer, or because the cathode black layer or the cathode MPL constituting the cathode gas diffusion layer may be treated to have the hydrophobic property, moisture can be easily discharged, and the hydrophobic portions can be easily patterned through printing or the like.

Moreover, because the hydrophobic portions may be formed such that the density is gradually reduced as it goes from the center of the cathode to the outer side, the appropriate amount of moisture can be discharged to easily adjust moisture within the MEA.

Further, because the hydrophobic property at the inner area may be made stronger than that at the outer area, and because the hydrophilic property at the inner area may be made weaker than that at the outer area, moisture generated at the inner side of the MEA can be easily discharged, thus preventing occurrence of flooding, and because the hydrophobic portions at the outer area may have a relatively low density, the appropriate amount of moisture may be provided to maintain water retention of the electrolyte membrane.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A membrane-electrode assembly (MEA) for a fuel cell, comprising:
    a fuel cell electrolyte membrane;
    an anode disposed at a first side of the electrolyte membrane;
    a cathode disposed at a second side of the electrolyte membrane; and
    a separator at an opposite side of the cathode from the electrolyte membrane,
    wherein:
    the cathode has a thickness and an area, the cathode area extending in a plane substantially parallel to a major surface of the electrolyte membrane,
    the cathode area includes a central area and an outer area surrounding the central area,
    the central area includes hydrophilic portions and hydrophobic portions,
    the outer area of the cathode area surrounding the central area includes hydrophilic portions and hydrophobic portions,
    the central area is formed to be more hydrophobic than the outer area of the cathode area surrounding the central area, and
    the cathode further includes a cathode catalyst layer in contact with the electrolyte membrane, and a cathode gas diffusion layer at an outer side of the cathode catalyst layer, such that:
    the cathode gas diffusion layer includes a central area and an outer area surrounding the central area,
    the central area of the cathode gas diffusion layer includes hydrophilic portions and hydrophobic portions, the outer area of the cathode gas diffusion layer surrounding the central area includes hydrophilic portions and hydrophobic portions, the central area of the cathode gas diffusion layer is formed to be more hydrophobic than the outer area of the cathode gas diffusion area surrounding the central area, an area density of the hydrophobic portions in the central area of the cathode gas diffusion layer being higher than that of the hydrophobic portions in the outer area of the cathode gas diffusion layer surrounding the central area, an air passage between the separator and the cathode is positioned such that moisture generated at the central area of the cathode gas diffusion layer is discharged from the hydrophobic portions in the central area of the cathode gas diffusion layer via the air passage between the separator and the cathode, the cathode gas diffusion layer includes a plurality of holes, which receive air via the air passage between the separator and the cathode, wherein an inner surface of at least one of the holes includes a hydrophobic or hydrophilic film and the hydrophobic portions and the hydrophilic portions of the cathode gas diffusion layer extend through an entire thickness of the gas diffusion layer to the cathode catalyst layer.

2. The MEA as claimed in claim 1, wherein the area density of the hydrophobic portions gradually decreases from the central area of the cathode gas diffusion layer to the outer area of the cathode gas diffusion layer surrounding the central area.

3. The MEA as claimed in claim 1, wherein the hydrophobic portions in the central area of the cathode gas diffusion layer are more strongly hydrophobic than the hydrophobic portions in the outer area of the cathode gas diffusion layer surrounding the central area.

4. The MEA as claimed in claim 1, wherein the hydrophilic portions in the outer area of the cathode gas diffusion layer surrounding the central area are more strongly hydrophilic than the hydrophilic portions in the central area of the cathode gas diffusion layer.

5. The MEA as claimed in claim 1, wherein an interval between the hydrophobic portions in the central area of the cathode gas diffusion layer is smaller than an interval between hydrophobic portions in the outer area of the cathode gas diffusion layer surrounding the central area.

6. The MEA as claimed in claim 5, wherein the hydrophobic portions in the central area of the cathode gas diffusion layer have a same width as the hydrophobic portions in the outer area of the cathode gas diffusion layer surrounding the central area.

7. The MEA as claimed in claim 5, wherein intervals between the hydrophobic portions increase monotonically from the central area of the cathode gas diffusion layer to the outer area of the cathode gas diffusion layer surrounding the central area.

8. The MEA as claimed in claim 1, wherein:
a width of the hydrophobic portions in the central area of the cathode gas diffusion layer increases from a first dimension to a second dimension, and
the hydrophobic portions in the outer area of the cathode gas diffusion layer surrounding the central area have a width substantially equal to the second dimension.

9. The MEA as claimed in claim 8, wherein:
a width of the hydrophobic portions monotonically increases moving along a radius of the central area of the cathode gas diffusion layer toward the outer area of the cathode gas diffusion layer surrounding the central area, and a width of the hydrophobic portions in the outer area of the cathode gas diffusion layer surrounding the central area is substantially constant.

10. The MEA as claimed in claim 8, wherein a width of the hydrophobic portions decreases from the central area of the cathode gas diffusion layer to the outer area of the cathode gas diffusion layer surrounding the central area.

11. The MEA as claimed in claim 10, wherein the width of the hydrophobic portions decreases monotonically from the central area of the cathode gas diffusion layer to the outer area of the cathode gas diffusion layer surrounding the central area.

12. The MEA as claimed in claim 1, wherein the hydrophobic portions form a continuous spiral from the central area of the cathode gas diffusion layer to the outer area of the cathode gas diffusion layer surrounding the central area.

13. The MEA as claimed in claim 1, wherein a plurality of hydrophobic portions extend as continuous radial members from the central area of the cathode gas diffusion layer to the outer area of the cathode gas diffusion layer surrounding the central area.

14. The MEA as claimed in claim 1, wherein:
the hydrophobic portions are discrete unit areas, and
a number of the discrete unit areas per unit area of the cathode decreases from the central area of the cathode gas diffusion layer to the outer area of the cathode gas diffusion layer surrounding the central area.

15. The MEA as claimed in claim 1, wherein:
the cathode gas diffusion layer includes a black layer and a micro-porous layer (MPL), and
the MPL includes a hydrophobic porous layer and a hydrophilic porous layer such that a central area of the MPL is more hydrophobic than a peripheral area of the MPL.

16. The MEA as claimed in claim 1, wherein the outer area of the cathode area completely surrounds the central area of the cathode area.

17. A fuel cell stack, comprising:
a plurality of electricity generating units; and
a pressing plate configured to press the electricity generating units together, wherein each of the electricity generating units includes:
a fuel cell electrolyte membrane;
an anode disposed at a first side of the electrolyte membrane;
a cathode disposed at a second side of the electrolyte membrane; and
a separator at an opposite side of the cathode from the electrolyte membrane,
wherein:
the cathode has a thickness and an area, the cathode area extending in a plane substantially parallel to a major surface of the electrolyte membrane,
the cathode area includes a central area and an outer area surrounding the central area,
the central area includes hydrophilic portions and hydrophobic portions,
the outer area of the cathode area surrounding the central area includes hydrophilic portions and hydrophobic portions,
the central area is formed to be more hydrophobic than the outer area of the cathode area surrounding the central area, and
the cathode further includes a cathode catalyst layer in contact with the electrolyte membrane, and a cathode gas diffusion layer at an outer side of the cathode catalyst layer, such that:

the cathode gas diffusion layer includes a central area and an outer area surrounding the central area, the central area of the cathode gas diffusion layer includes hydrophilic portions and hydrophobic portions, the outer area of the cathode gas diffusion layer surrounding the central area includes hydrophilic portions and hydrophobic portions, the central area of the cathode gas diffusion layer is formed to be more hydrophobic than the outer area of the cathode gas diffusion area surrounding the central area, an area density of the hydrophobic portions in the central area of the cathode gas diffusion layer being higher than that of the hydrophobic portions in the outer area of the cathode gas diffusion layer surrounding the central area, an air passage between the separator and the cathode is positioned such that moisture generated at the central area of the cathode gas diffusion layer is discharged from the hydrophobic portions in the central area of the cathode gas diffusion layer via the air passage between the separator and the cathode, the cathode gas diffusion layer includes a plurality of holes, which receive air via the air passage between the separator and the cathode, wherein an inner surface of at least one of the holes includes a hydrophobic or hydrophilic film and the hydrophobic portions and the hydrophilic portions of the cathode gas diffusion layer extend through an entire thickness of the gas diffusion layer to the cathode catalyst layer.

* * * * *